Dec. 16, 1969     J. J. OPALENIK ET AL     3,484,632
VARIABLE SPEED CONTROLLER FOR PORTABLE ELECTRIC DEVICES
Filed Jan. 12, 1967     2 Sheets-Sheet 1

INVENTORS
John J. Opalenik
Lawrence G. Corey
By Davis, Hoxie, Faithfull & Hapgood
Attorneys

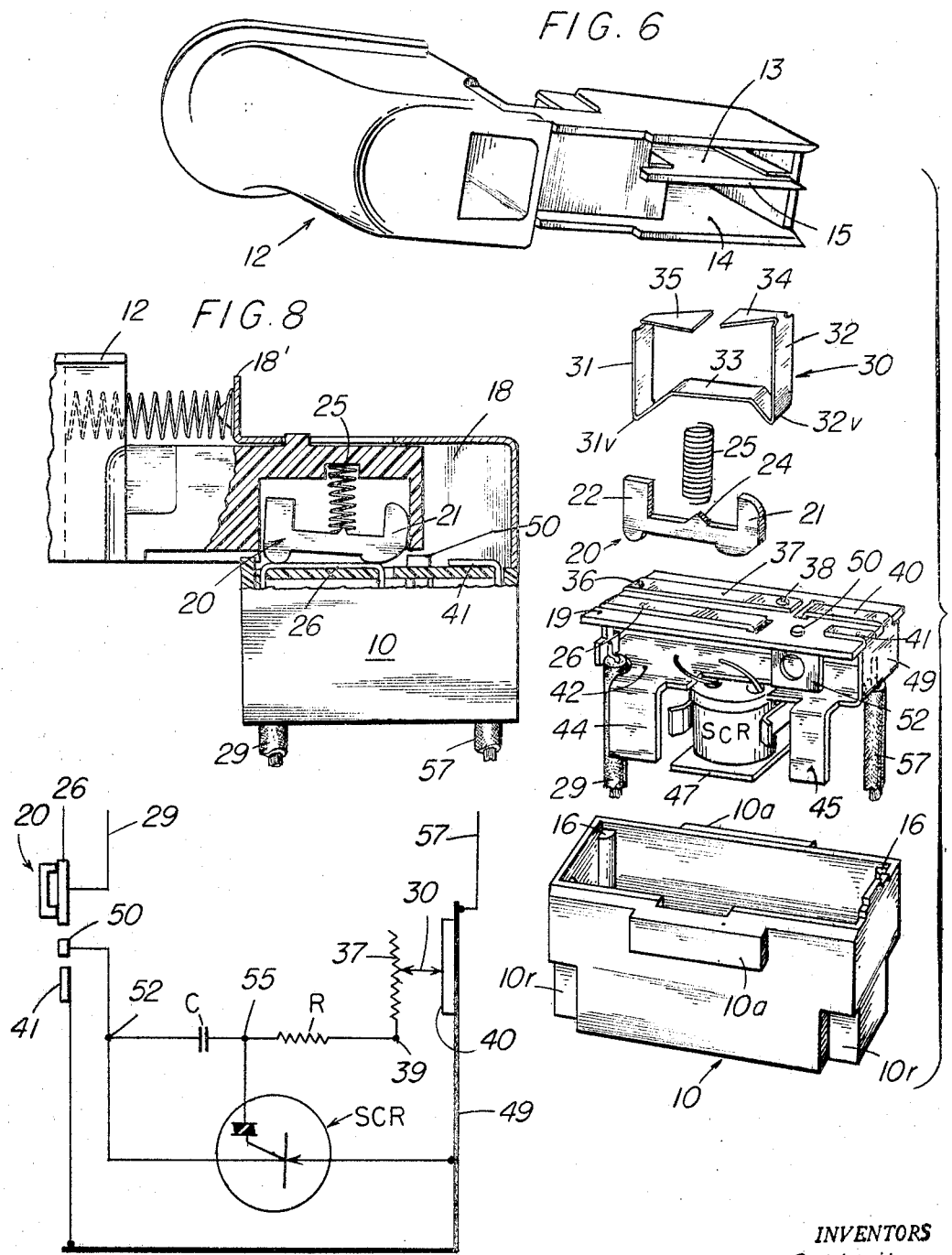

United States Patent Office

3,484,632
Patented Dec. 16, 1969

1

3,484,632
VARIABLE SPEED CONTROLLER FOR PORTABLE ELECTRIC DEVICES
John J. Opalenik, New Britain, and Lawrence G. Corey, Rockville, Conn., assignors to The Arrow-Hart & Hegeman Electric Company, Hartford, Conn., a corporation of Connecticut
Filed Jan. 12, 1967, Ser. No. 608,912
Int. Cl. H02k *11/00;* H02p *7/08*
U.S. Cl. 310—68                3 Claims

ABSTRACT OF THE DISCLOSURE

A controller for electric motors in portable power tools includes a silicon controlled rectifier in an electronic circuit in which and to which the flow of power is progressively controlled by movement of a trigger member that operates switch contacts to open the circuit, to encircuit the electronic components and to apply full-line voltage to the motor. The assembly is compact enough to permit its use in the space heretofore required by a conventional ON and OFF switch.

---

This invention relates to an electric switching and power control device for closing and opening an electric circuit to an electric motor, such as the motor of an electric power tool, and for progressively increasing and decreasing power, from open-circuit to full power supply conditions.

Heretofore, in the manufacture of portable power tools, such as electric drills, sabre saws and the like, a trigger-operated motor controlling switch has been incorporated within the housing of the tool, enough room being provided in the housing for a conventional ON-OFF switch.

In recent years, motor controlling devices have been developed having electronic circuit components which could be compactly arranged and controlled by a trigger-type operating member. But the size of such devices, if they were of quality and ruggedness to stand usage under commercial conditions, required redesign of the tool housing, thus increasing the cost of the whole tool.

One of the circuit components was a silicon controlled rectifier (SCR) which required means to dissipate the heat developed in use, to protect the rectifier from destruction or harm that might occur at elevated temperatures. Another component was a variable resistance whose variation was controllable by the trigger.

It is an objective of this invention to create an arrangement of the foregoing and other essential elements within the same space formerly occupied by a switch, by rearrangement of parts and redesign of most of them as well as the whole assembly based on new concepts with respect to the form and assemblage of the parts and the current path through the device.

According to the invention, a trigger member actuates both a movable switch member and a movable brush contact of a variable resistance assembly or potentiometer. The fixed contacts of the switch and the resistance strip of the potentiometer are mounted on an insulating plate in an insulating casing. Also in the casing are electronic circuit parts and a novel form of heat sink and receptacle for an SCR. The heat sink serves also as a current conducting part and provides fixed contacts for the potentiometer and switch. Movement of the trigger from OFF position first encircuits the electronic parts and finally causes the movable switch contact to bypass the potentiometer entirely. The movable contact is arranged to open the circuit with a quick break from the electronic components when moving into full-power position and when moving to OFF position.

2

Figure 1:
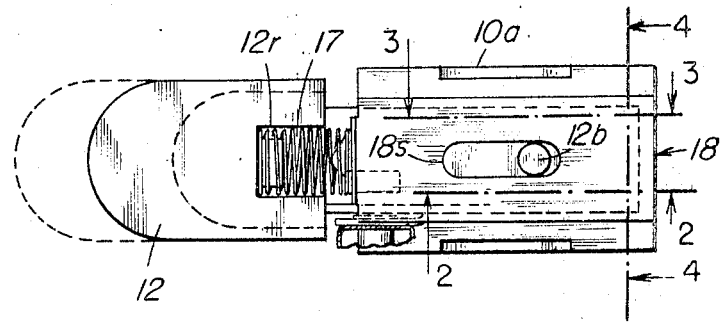
Figure 5:
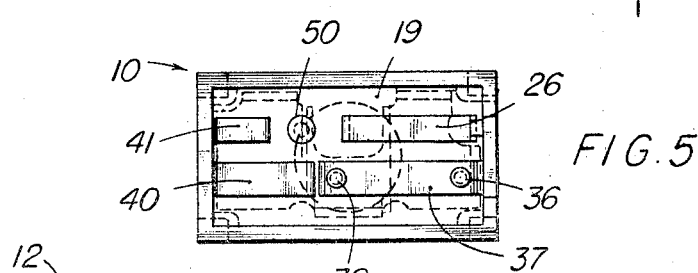
Figure 2:
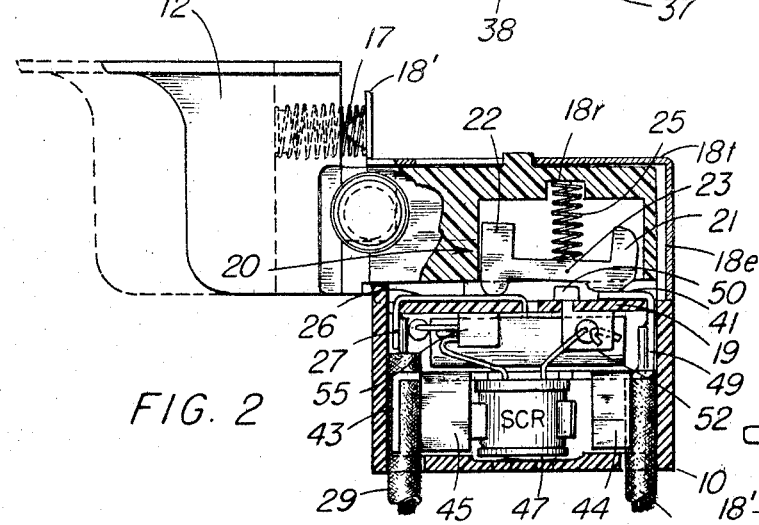
Figure 4:
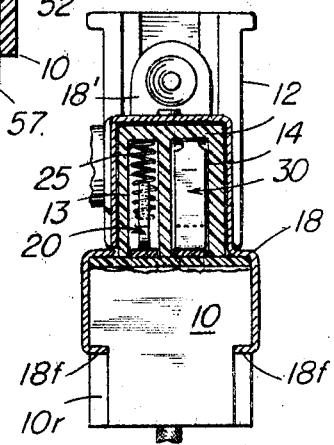
Figure 3:
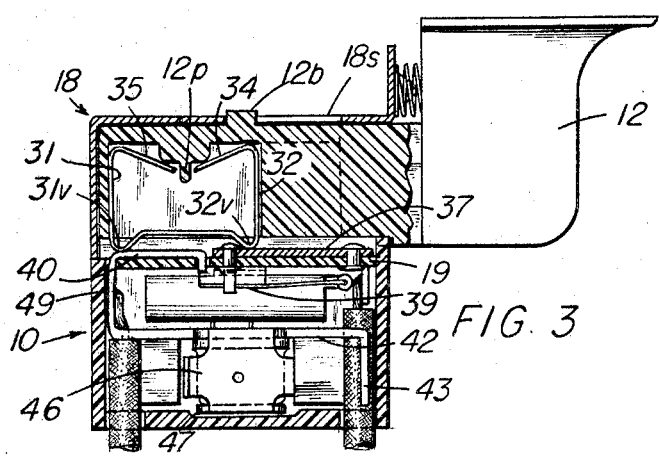

In the drawings:
FIG. 1 is a top plan view of the invention.
FIG. 2 is a side elevation view, partly in section, of one side of the invention as illustrated in FIG. 1 with parts in ON position, the section being along line 2—2 of FIG. 1.
FIG. 3 is a side elevation view, partly in section, of the other side of the device of FIG. 2 with parts in ON position, the section being along line 3—3 of FIG. 1.
FIG. 4 is an end elevation view of the device of FIG. 1 with the trigger member partly in section along line 4—4 of FIG. 1.
FIG. 5 is a top plan view of the casing with the parts contained therein, the trigger and frame having been removed from the device.
FIG. 6 is an exploded perspective view of the casing, the interior parts, the movable contacts and the trigger of the device illustrated in FIGS. 1–4.
FIG. 7 is a circuit diagram illustrating the connection of the device illustrated in FIGS. 1–4.
FIG. 8 is a view similar to FIG. 2, but with the device in OFF position.

Referring to the drawings, the invention comprises a generally rectangular hollow casing 10 of molded insulating material within which are the stationary parts of the device. Located over the casing is a trigger member 12 of molded insulating material which is manually movable by the operator's finger between an ON position and an OFF position as shown in full and dotted lines, respectively, in FIGS. 1 and 2.

The trigger member is held slidably upon the casing by a stamped sheet metal frame 18 configured to embrace the flat top and side walls of the trigger and the side walls of the casing 10. The frame has an integral end wall 18e bent down from its top wall 18t. The end and top and side walls of the frame form an enclosure shielding the conductive parts (presently to be described) that are within and upon the casing. The side walls of the frame are apertured to receive rectangular bosses 10a laterally extending from each of the side walls of the casing adjacent its top edges; and fingers 18f extend from lower edges of the frame at its corners in position to be bent into recess 10r in the lower corners of the casing.

The trigger is biased by a coiled compression spring 17 entering and pressing against one end of a recess 12r in the portion of the trigger which extends outside the frame. At its other end the spring presses against a lug 18' bent up at a right angle from the top of the frame. Sliding motion of the trigger within the frame is limited by a boss 12b on the trigger extending up through a longitudinal slot 18s on the top wall of the frame. The portion of the trigger which slides in the frame has two parallel longitudinal compartments 13 and 14 separated by a barrier 15 (see FIG. 6). Positioned in one compartment 13 is a movable bridging contact shoe, designated generally by numeral 20. The shoe 20 is stamped from sheet metal of good electrical conductivity into the shape shown in FIGS. 2 and 6 with toe and heel portions 21 and 22 connected by a middle portion 23 extending lengthwise of the recess. A peak 24 (FIG. 6) on said middle or connecting portion receives one end of a coiled compression spring 25 while the other end of the spring is seated in a circular recess 18r inside of the top wall of the trigger. The heel and toe portions are adapted to slide upon stationary contacts as the trigger is moved, as will hereinafter be described.

In the other compartment 14 of the trigger is positioned a brush contact 30 stamped from resilient sheet metal as a strip and bent into the form illustrated best in FIGS. 3 and 6. The brush contact comprises parallel end portions 31 and 32 joined by a bent midportion 33 which forms V-shaped joints with each of the end portions 31 and 32. The joints comprise brush contacts which ride upon and over a stationary contact and an electrical resistance strip as the trigger is moved, as will hereinafter more fully appear.

The extremities of portions 31 and 32 are bent at right angles toward each other leaving a gap between them so that they may engage and frictionally grip a rib or transverse protuberance 12p extending into the compartment 14 from the top wall of the trigger 18 midway along the compartment 14.

As the trigger is moved within the frame from the OFF or dotted-line position of FIGS. 1 and 2 (the same as the position of FIG. 8) to the full-line or ON positions of FIGS. 1, 2 and 3 by the finger of the operator, the movable switch contact 30 and the brush contact 20 move with the trigger.

A resistance strip and several stationary contacts are mounted on a thin rectangular insulating plate 19 which is mounted in the open top of the casing 10 and rests on fillets 16 in the corners of the casing (see FIG. 6).

For cooperation with and sliding engagement by the brush contact 30, a resistance strip 37 is mounted on the outer surface of the insulating plate 19 extending from one end toward the other on one side of the longitudinal midline of the insulating plate. Conductive rivets 36 and 38 at each end of the strip secure it to the plate. The rivet 38 serves also to secure a thin stamped sheet metal wire terminal 39 against the opposite face of the plate.

In alignment with the resistance strip 37, but spaced from it, is a stationary contact strip 40 which is formed as an extension of and is bent down from a stamped sheet metal member. This member is of novel and unusual form and is preferably made of a metal, such as copper or other metal or alloy which is a good conductor of heat and electricity so that the member may serve both as conductor of electric current in the circuit in which the device is used and also may serve as a heat sink to conduct away heat from a rectifier component in the circuit, all as will hereinafter be fully described.

Adapated to be connected and disconnected by the bridging contact 20 as the trigger is moved are two narrow stationary contact strips 26 and 41. Contact 26 is an L-shaped stamping from a sheet metal strip with its longer leg lying on the top or outwardly facing surface of the insulating plate on the opposite side of the longitudinal midline from the resistance strip 37. Preferably the extreme end of the leg is bent at a right angle inwardly into a small rectangular hole in the plate while the opposite end is bent at a right angle over the end of the insulating plate to provide a terminal 27 to which the bared end of a lead wire 29 may be soldered.

A contact 41 is aligned with contact 26 and is formed as an extension from the heat sink and is bent down so as to lie flat upon the surface of the plate 19.

Between the switch contacts 26 and 41, there is a space in which is positioned an electronic circuit contact 50, preferably in the form of the head of a silver or other highly conductive rivet which passes through the plate 19 and through a wire terminal 52, thus to secure itself on the outer surface of the plate and the wire terminal against the under surface of the plate. The wire terminal 52 is preferably a thin sheet metal stamping bent to provide a tab to which wires from the electronic components of the device may be connected as hereinafter more fully described.

Referring to FIGS. 2, 3 and 6, the heat sink member as above indicated is a metal stamping having a central plate part 42 extending parallel to the insulation plate 19 and the bottom of the casing and between them. At one end (the right end of FIG. 6), the plate portion 42 was extended and is bent up at a right angle toward the insulation plate 19. It is from the top edge of this bent-up portion that the aforementioned contacts 40, 41 extend. From the opposite end (the left end in FIGS. 2 and 6) of the central plate part, an extension 43 is bent down at a right angle forming a heat dissipating fin 49. Similar heat dissipating fins 44 and 45 are bent down as extensions from one of the side edges of the central plate part. All the fins lie closely adjacent the casing walls, but not necessarily touching them.

A receptacle formation for a silicon controlled rectifier of the type contained within a cylindrical metal container or can having two conductor wires issuing from one end thereof is provided on the heat sink between it and the floor of the casing. This receptacle formation is created by bending an extension of the side edge of the central plate part (opposite the heat fins 44 and 45) at a right angle toward the floor of the casing as at 46 (FIG. 3) and then further bending that extension at a right angle parallel to the casing floor, thus forming a bottom plate 47 (see FIGS. 6, 2 and 3) on which the bottom of the SCR container rests while the top of said container is pressed against the under surface of the central plate part 42. Embracing the SCR can on opposite sides are a pair of resilient fingers 48 which are formed as fingers laterally extending from the part 46 of the heat sink and bent at substantially right angles in the same direction from the part 46. The ends of the fingers are flared outwardly so that the SCR can be inserted between them and the central and top plate parts 42 and 47.

The parts as thus far described may be assembled in the positions previously described and as best indicated in FIGS. 1–4 and 8. When so assembled, the parts will normally occupy a position with the trigger biased into the position of FIG. 8 or dotted-line position of FIGS. 1 and 2. In such position, the movable contact 20 will be in the OFF position of the switch (FIG. 8) wherein both the heel and toe portions 21 and 22 of the movable contact rest upon the fixed contact 26. Concomitantly, the brush contact 30 will be in a maximum resistance position (i.e. to the right of that shown in FIG. 3) wherein the right-hand end 32 of the brush contact will be near the right end of the resistance strip 37 while the left end of the brush contact will be still in engagement with the fixed contact 40, but near the right end of contact 40.

When the trigger is pressed to move the contacts from OFF position of FIG. 8, the trigger moves from the dotted position of FIGS. 1 and 2 toward the full-line position. This causes the brush contact 30 to move over the resistance strip cutting out of the circuit more and more of the resistance until the position of FIG. 3 is reached at which there is minimum resistance in the circuit.

Referring to FIGS. 2 and 8 for describing the movement of the switch contact and assuming that the trigger is in the dotted-line or OFF position of FIG. 8, the exertion of pressure on the trigger will move the toe 21 of the movable contact, firstly off the fixed contact 26 and immediately into engagement with the center or electronic circuit contact 50. Then as the trigger is further pressed against the bias of the spring 17, the toe 21 of the movable contact 20 will reach the edge of the electronic circuit contact 50.

It is desirable for the toe part 21 of the movable contact to move from the electronic circuit contact 50 onto the full power contact 41 with a sudden dropping motion and, conversely on reverse motion, for the toe part to move off the contact 50 onto the contact 26 into the FIG. 8 position as contact 20 disengages the contact 50 and breaks the circuit. The making and breaking of the circuits are more fully described below in connection with the circuit diagram of FIG. 7.

To cause the aforesaid quick contact motion, the forward corner of the toe part 21 is curved or bevelled and likewise the trailing edge of the toe part is also curved or bevelled. This curvature acting together with the force of contact biasing spring 25 is able to bring about the desired result in the following manner.

The spring 25 normally exerts pressure on the movable contact 20 perpendicular to the flat top surfaces of the contacts 26 and 50. This pressure increases the friction as the movable contact 20 moves over the fixed contacts, causing a drag on the movable contact as it moves.

As may be seen in FIGS. 2 and 8, the movable contact 28 is slightly shorter in length than the length of the compartment 13 of the trigger in which the contact 28 is located. In moving from OFF (FIG. 2) toward ON (FIG. 8), it is possible for the movable contact to have a slight amount of motion independent of the trigger under two conditions. Firstly, when the leading curved edge of the movable contact passes over and is about to pass off the right edge of contact 50, the inclination of the trailing edge of the toe changes the direction of the application of the spring pressure. This creates a component of force tending to move the contact 20 to the right toward the fixed full-power contact 41 so that the movable contact quickly moves toward contact 41. The surface of top flat contact 50 is a few hundredths of an inch higher than the top flat surface of contact 41. Thus, the toe of the movable contact will drop down on the contact 41 as the toe moves off the contact 50.

Secondly, on return motion of the trigger, a similar operation occurs in the reverse direction as the leading edge of the toe becomes the trailing edge and quickly disengages the contact 50 on moving onto the contact 26.

The action of the movable contact above described from one extreme position to the other reduces arc damage and prolongs the life of the contacts.

Referring now to the circuit diagram of FIG. 7 showing the circuit connections of the device as thus far described, similar reference numerals refer to similar parts in the diagram and in the other figures. In addition, there are shown, in the diagram, a fixed resistor R and a capacitor C.

The fixed resistor R is connected at one end to the variable resistance strip 37 through the wire terminal 39.

The capacitor is connected at one end to the electronic switch contact 50 and to the cathode wire lead of the SCR through the wire terminal 52.

The other sides of the fixed resistor R and the capacitor are connected together and to the wire of the gate terminal of the SCR at a barrel connector 55 (FIG. 2).

The anode of the SCR is internally connected to the can which is conected to the fixed contact 40 of the variable resistance at the heat sink part 49.

The heat sink has the bared end of a lead wire 57 soldered to its part 49, or spot welded or otherwise suitably connected.

What is claimed is:

1. A power controller for varying the speed of an electric motor comprising a hollow insulating casing, a manually operating member, means securing said operating member slidably relative to said casing, a pair of terminals within said casing for connecting said controller in circuit with an electric motor and power source, switching means and a solid-state semiconductor control device supported within said casing, said switching means including two fixed end contacts and an intermediate fixed contact and bridging contact means slidable over said fixed contacts, the surface of said intermediate contact being above the contacting surface of one of said end contacts, electrical connections from said intermediate contact and said one of said end contacts to said control device, said operating member engaging and moving said bridging contact means, means biasing said bridging contact means toward said fixed contact members, and means on said bridging contact means which directs a component of force of said biasing means as said bridging contact means leaves said intermediate contact to cause quick-action movement of the bridging contact means from said intermediate contact to said one end contact, said bridging contact means being movable from a position of nonengagement with said intermediate contact through a position engaging said intermediate contact to a position bridging said end contacts to pass full power between said end contact members.

2. A power controller as claimed in claim 1 wherein the bridging contact means is formed with inclined surfaces to cause said quick-action engagement of the bridging contact means and both fixed end contacts.

3. A power controller as claimed in claim 1 wherein the bridging contact means is formed with an arcuate portion which prolongs the period of engagement with said intermediate contact member for a given amount of rectilinear movement of said bridging contact means, and which directs a component of force of said biasing means as said contact means leaves said intermediate contact to cause quick-action movement of the bridging contact means from said intermediate contact to said one end contact.

References Cited
UNITED STATES PATENTS

| | | | |
|---|---|---|---|
| 3,209,228 | 9/1965 | Gawron | 323—22 XR |
| 3,327,196 | 6/1967 | Sahrbacker | 318—345 |
| 3,329,842 | 7/1967 | Brown | 318—345 XR |
| 3,047,648 | 7/1962 | Mowatt. | |
| 3,389,365 | 6/1968 | Matthews et al. | 338—202 |

ORIS L. RADER, Primary Examiner

R. J. HICKEY, Assistant Examiner

U.S. Cl. X.R.

200—157; 318—345; 338—202